May 18, 1926.
R. J. KRAUTHEIM
TROLLEY HEAD SUPPORT
Filed Sept. 14, 1925
1,585,352
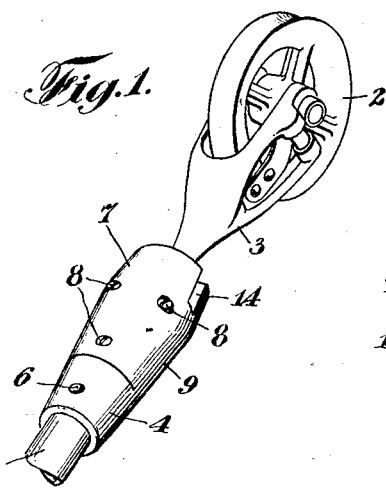
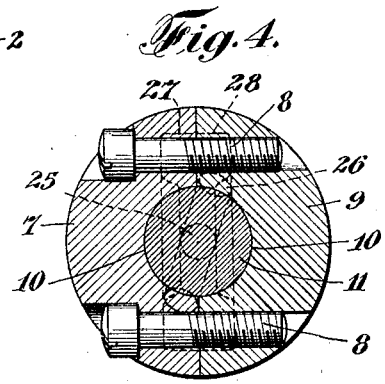
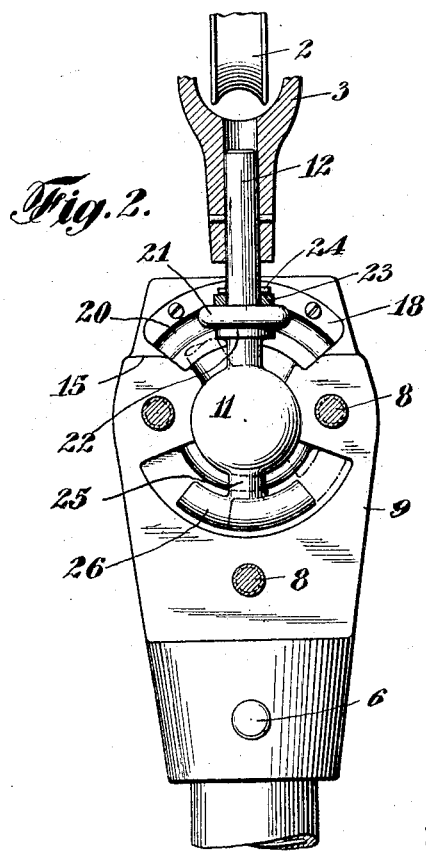
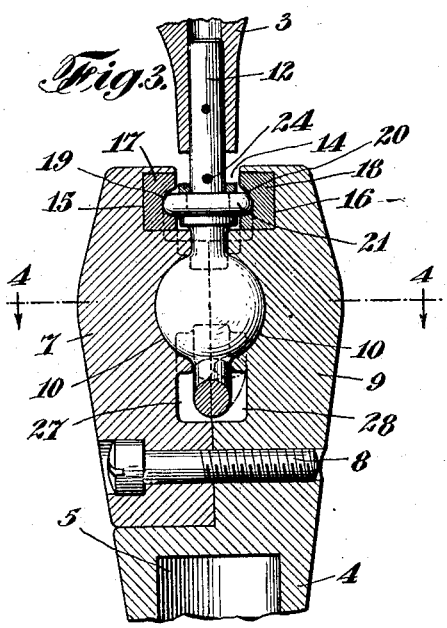
Inventor:
Richard J. Krautheim,
By Everett & Rook,
Attorneys.

Patented May 18, 1926.

1,585,352

UNITED STATES PATENT OFFICE.

RICHARD J. KRAUTHEIM, OF NEWARK, NEW JERSEY; BERTHA KRAUTHEIM ADMINISTRATRIX OF SAID RICHARD J. KRAUTHEIM, DECEASED.

TROLLEY-HEAD SUPPORT.

Application filed September 14, 1925. Serial No. 56,206.

The objects of this invention are to secure an improved support for a trolley head and more particularly one which will allow the head a limited rotary movement upon an axial line extending centrally and longitudinally of the trolley pole and also allow said head a limited swinging movement horizontally from side to side; to thus impart to the trolley head sufficient freedom so that the trolley wheel can follow the sharp curve of the overhead wire at a street corner or the like; to secure less wear and friction; to lessen liability of the trolley head coming off the wire, and to obtain other results and advantages as may be brought out by the following description.

Referring to the accompanying drawing, in which like numerals of reference indicate the same parts in the several views, Figure 1 is a perspective view of the upper end of a trolley pole provided with my support carrying the trolley wheel and its fork;

Figure 2 shows the detachable part of the support removed, and the trolley fork in section, dot and dash lines indicating the positions of certain parts when the trolley wheel swings to the extreme left-hand;

Figure 3 is a central longitudinal section at right angles to the view seen in Figure 2, with dot and dash lines showing the position of a certain cross-piece when the trolley head turns to the limit of its rotary movement as shown in Fig. 4, and Figure 4 is a cross-section on line 4—4 of Fig. 3, with the trolley head turned to the limit of its rotary movement in one direction.

In said drawings, 1 indicates the upper part of a trolley pole such as projects from the trolley cars which are common on electric street railways, and which carries at its upper end my improved support for the trolley head comprising the wheel 2 and its fork 3. Said support is substantially cylindrical in cross-section, slightly flaring upwardly, and comprises two sections one of which has a substantially cylindrical end portion 4 socketed as at 5 to receive the upper end of the trolley pole 1 and be secured thereon as by a rivet 6. Beyond said portion 4 the support is halved, so that the removable section 7 lies flatwise against the corresponding portion 9 of the other section and is shown secured thereto by suitable screws 8. The opposite halves 7 and 9 of the support have opposite semi-spherical recesses 10, 10 to receive a ball 11 from which a stem 12 projects beyond the upper end of the support and enters the socketed lower end of the fork 3, a rivet 13 being passed through said parts to hold them in fixed relation. The stem 2 projects through a transverse slot 14 in the end of the support formed by oppositely recessing the halved portions 7 and 9 of said support, as at 15, 16, and in the floor of said recesses are set steel plates 17, 18 in which are arcuate grooves 19, 20, respectively, to receive a steel roller 21 upon the stem 12, said roller being held by a stop 22 at the side of the wheel next the ball 11 and a collar 23 and pin 24 at the opposite side. The body of the support, comprising the two halves 7 and 9 and the end portion 4, is preferably of malleable iron, and the said steel plates 17, 18 riveted thereto.

Obviously, the range of travel of the roller 21 in the grooves 19, 20 permits a limited swinging of the trolley wheel 2 and its fork 3 in the direction of the slot 14, see Figure 1, which thus confines such swinging to a horizontal side to side path such as is advantageous in rounding a sharp curve or the like.

Opposite the stem 12 the ball 11 has a projecting neck 25 carrying a cross-piece 26 which lies in the plane of swinging of the trolley head which has been described. This cross-piece 26 is preferably curved concentric with the ball 11 and moves in a chamber formed by opposite recesses 27, 28 in the halves of the trolley head, said chamber being enough deeper than the thickness of the cross-piece 26 to permit said cross-piece to twist to a limited extent. This twisting permits the trolley wheel, in turning a sharp corner or the like, to momentarily take a position, in connection with its freedom of swinging already described, so as to hold the wheel 2 always in firm contact with the trolley wire. At the same time, such twisting is limited by the ends of the cross-piece 26 striking the bottoms of the recesses 27, 28, as shown in Figure 4, and it will be noted that said recesses are lengthened beyond the length of the cross-piece 26 to permit the roller 21 to roll back and forth its entire range of movement.

Obviously, various modifications may be made by those skilled in the art in carrying out my invention, without departing from the spirit and scope thereof, and I do not desire to be understood as limiting myself except as required by the following claims when construed in the light of the prior art.

Having thus decribed the invention, what I claim is:

1. A trolley head support for electric street railways, comprising a member adapted to be mounted at the top of the trolley pole and providing a transversely slotted end, a ball rotatably held in said member having a stem projecting through said slot and adapted to receive a trolley wheel fork, a roller on said stem engaging the opposite walls of the slot, and a cross-piece at the opposite side of said ball from said stem having a limited twisting movement in a recess in the support.

2. A trolley head support for electric street railways, comprising a member having a substantially cylindrical end to connect with the top of a trolley pole and being divided into halves for the remainder of its length, a ball between said halves having a stem projecting therefrom and an opposite neck, a roller on said stem and a cross-piece on said neck, said halves being oppositely hollowed to provide a seat for said ball and oppositely recessed at their outer ends to provide a passage for said stem and bearings for said roller and oppositely recessed at their inner ends to form a chamber for said cross-piece to swing and to have a limited twisting movement, and means for fastening said halves together.

3. A trolley head support for electric street railways comprising a member having a substantially cylindrical end to connect with the top of a trolley pole and being divided into halves for the remainder of its length, a ball between said halves having a stem projecting therefrom and an opposite neck, a roller on said stem and a cross-piece on said neck, said halves being oppositely hollowed to provide a seat for said ball and oppositely recessed at their outer ends to provide a passage for said stem and at their inner ends to form a chamber for said cross-piece to swing and to have a limited twisting movement, plates secured in said outer recessed and forming tracks for the roller on the stem, and means for fastening said halves together.

4. A trolley head support for electric street railways, comprising a member adapted to be mounted at the top of the trolley pole and providing a transversely slotted end, a ball rotatably held in said member having a stem projecting through said slot and adapted to receive a trolley wheel fork, and a cross-piece at the opposite side of said ball from said stem having a limited twisting movement in a recess in the support.

5. A trolley head support for electric street railways, comprising a member having a substantially cylindrical end to connect with the top of a trolley pole and being divided into halves for the remainder of its length, a ball between said halves having a stem projecting therefrom and an opposite neck, a cross-piece on said neck, said halves being oppositely hollowed to provide a seat for said ball and oppositely recessed at their outer ends to provide a passage for said stem and at their inner ends to form a chamber for said cross-piece to swing and to have a limited twisting movement, and means for fastening said halves together.

RICHARD J. KRAUTHEIM.